(12) United States Patent
Maier et al.

(10) Patent No.: US 10,730,565 B2
(45) Date of Patent: Aug. 4, 2020

(54) TRACTOR FENDER ASSEMBLY

(71) Applicant: AGCO International GmbH, Neuhausen (CH)

(72) Inventors: Thomas Maier, Unterthingau (DE); Erich Freytag, Sachsenried (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 16/666,877

(22) Filed: Oct. 29, 2019

(65) Prior Publication Data
US 2020/0062317 A1 Feb. 27, 2020

Related U.S. Application Data

(63) Continuation of application No. 15/876,302, filed on Jan. 22, 2018, now Pat. No. 10,507,872.

(30) Foreign Application Priority Data

Feb. 1, 2017 (GB) .................................... 1701652.8

(51) Int. Cl.
*B62D 25/16* (2006.01)
*B62D 25/18* (2006.01)

(52) U.S. Cl.
CPC ......... *B62D 25/182* (2013.01); *B62D 25/166* (2013.01); *B62D 25/168* (2013.01); *B62D 25/186* (2013.01)

(58) Field of Classification Search
CPC .. B62D 25/163; B62D 25/166; B62D 25/182; B62D 63/04; B60R 11/04; B60R 11/06; B60R 2019/002
See application file for complete search history.

(56) References Cited

U.S. PATENT DOCUMENTS 5,074,573 A * 12/1991 Dick ...................... B62D 25/16
248/289.31
6,007,102 A * 12/1999 Helmus ................ B62D 25/182
280/847

* cited by examiner

*Primary Examiner* — Bryan A Evans

(57) ABSTRACT

A fender assembly for an agricultural tractor including a carrier bracket which supports a wheel fender adjacent to a vehicle wheel. A steering mechanism is provided as part of the fender assembly, such that the wheel fender can be rotated relative to the carrier bracket. Accordingly, the rotation of the wheel fender can be controlled based on a steering signal generated by the vehicle steering system, to ensure that the wheel fender accurately follows the movement of the adjacent tractor wheel.

7 Claims, 6 Drawing Sheets

TRACTOR FENDER ASSEMBLY

CROSS REFERENCE TO RELATED APPLICATION

This application a continuation of U.S. patent application Ser. No. 15/876,302, filed Jan. 22, 2018, which is hereby incorporated by reference in its entirety.

BACKGROUND OF THE INVENTION

Field of the Invention

The present invention relates to fender assemblies for vehicles, and in particular to an agricultural tractor having such a fender assembly.

Description of Related Art

In some vehicles, wheel fenders can be provided separately to the general vehicle structure. For example, in many agricultural tractors wheel fenders for the front wheels of the tractor are provided as separate elements to the vehicle frame. The fenders in such tractors are normally mounted to support arms which are attached to the wheel carriers of the vehicle to allow the fender to rotate with the wheel, as can be seen in U.S. Pat. No. 5,511,808.

However, the use of wheel carrier-mounted support arms for fenders can present challenges when incorporated into certain vehicles. For example, for tractors with increased wheel size or increased engine and hood size, the support arms have to be designed and constructed to avoid interfering with the adjacent wheels and/or the adjacent vehicle structure. This can lead to the use of relatively complex arm structures, with multiple possible points of failure.

As a result, it is an object of the invention to provide a fender system which is suitable for use with vehicles of all sizes and dimensions.

SUMMARY OF THE INVENTION

Accordingly, there is provided an agricultural tractor, comprising:
a. a tractor frame;
b. a tractor wheel provided on a wheel carrier, the wheel carrier mounted to the tractor frame; and
c. a steering system arranged to steer the tractor wheel;
wherein the tractor further comprises at least one fender assembly, the fender assembly comprising:
d. a carrier bracket attached to the tractor frame, the carrier bracket separate from the wheel carrier;
e. a wheel fender supported by the carrier bracket to be located above the tractor wheel; and
f. a steering mechanism provided on the carrier bracket, the wheel fender mounted to the steering mechanism, wherein the steering mechanism arranged to receive a steering signal from the steering system of the tractor, and wherein the steering mechanism rotates the wheel fender relative to the carrier bracket based on the received steering signal.

As the fender assembly is not mounted to the wheel or an associated wheel carrier, accordingly a single fender assembly is suitable for use with tractor wheels of substantially any dimension. In addition, as the wheel fender can be rotated based on the steering signal for the tractor wheels, the fender can be controlled to follow the movement of the tractor wheel as appropriate during operation of the vehicle.

Preferably, the steering mechanism is arranged to rotate the wheel fender to substantially follow rotation of the tractor wheel. It will be understood that the steering mechanism may halt rotation of the wheel fender to prevent the wheel fender striking the vehicle frame.

Preferably, the steering mechanism comprises an actuator operable to rotate the wheel fender.

The actuator may comprise an electric, hydraulic, pneumatic, or mechanically-controlled element.

Preferably, the steering mechanism rotates the wheel fender about a vertical axis.

Preferably, the fender assembly comprises at least one light fixture provided on the carrier bracket. Such a light fixture may comprise at least one of the following: an indicator light, a headlight, a spotlight.

Arranging light fixtures on the carrier bracket can provide for increased area of illumination for the vehicle, aiding the vehicle operator's view of the surroundings.

Additionally or alternatively, at least one camera may be provided on the carrier bracket. Such a camera can be used to provide a visual feed of the area around the adjacent tractor wheel.

Moreover or alternatively, at least one sensor may be provided on the carrier bracket, for example an ultrasonic sensor or a radar sensor. Such a sensor can be used for control operations of the vehicle, e.g. autonomous drive of the tractor.

Preferably, the fender assembly further comprises an extendable element coupled to the wheel fender, the extendable element operable to move the wheel fender between a retracted position wherein the wheel fender is located adjacent the carrier bracket, to an extended position wherein the wheel fender is located distal from the carrier bracket.

Through the use of the extendable element, the wheel fender is moveable outwards and away from the carrier bracket and the attached tractor vehicle frame. The extended position may be used to accommodate different track widths of tractor, and/or to provide a mechanism for moving the wheel fender away from the main tractor body, to provide easier access to the tractor vehicle frame for service and repair operations.

Preferably, the extendable element comprises a telescopic element. Additionally or alternatively, the extendable element is provided as a rail element, the wheel fender moveable in a lateral direction along the rail relative to the carrier bracket.

Preferably, the steering mechanism is provided on the extendable element, such that the steering mechanism is operable to rotate the wheel fender when the wheel fender is in the extended position.

Alternatively, the extendible element is mounted to the carrier bracket through the steering mechanism, such that the steering mechanism is operable to rotate the extendible element and the wheel fender relative to the carrier bracket when the wheel fender is in the extended position.

In a further embodiment of the invention, the fender assembly may be provided with a mechanism to rotate the wheel fender parallel to the circumference of an adjacent tractor wheel.

By rotating the wheel fender about the circumference of the wheel, further ease of access can be facilitated in the area adjacent to the fender assembly.

Preferably, the fender assembly is provided for a front wheel of the tractor, and preferably complementary fender assemblies are provided for the left and right front wheels.

The carrier bracket is preferably arranged to extend from the tractor vehicle frame, in a direction transverse to the longitudinal axis of the vehicle.

In alternate embodiment, the carrier bracket of the fender assembly is provided as an integrally-formed part of the tractor vehicle frame.

BRIEF DESCRIPTION OF THE DRAWINGS

Embodiments of the invention will now be described, by way of example only, with reference to the accompanying drawings, in which.

The drawings are provided by way of reference only, and will be acknowledged as not to scale.

DETAILED DESCRIPTION OF THE INVENTION

Figure 1:
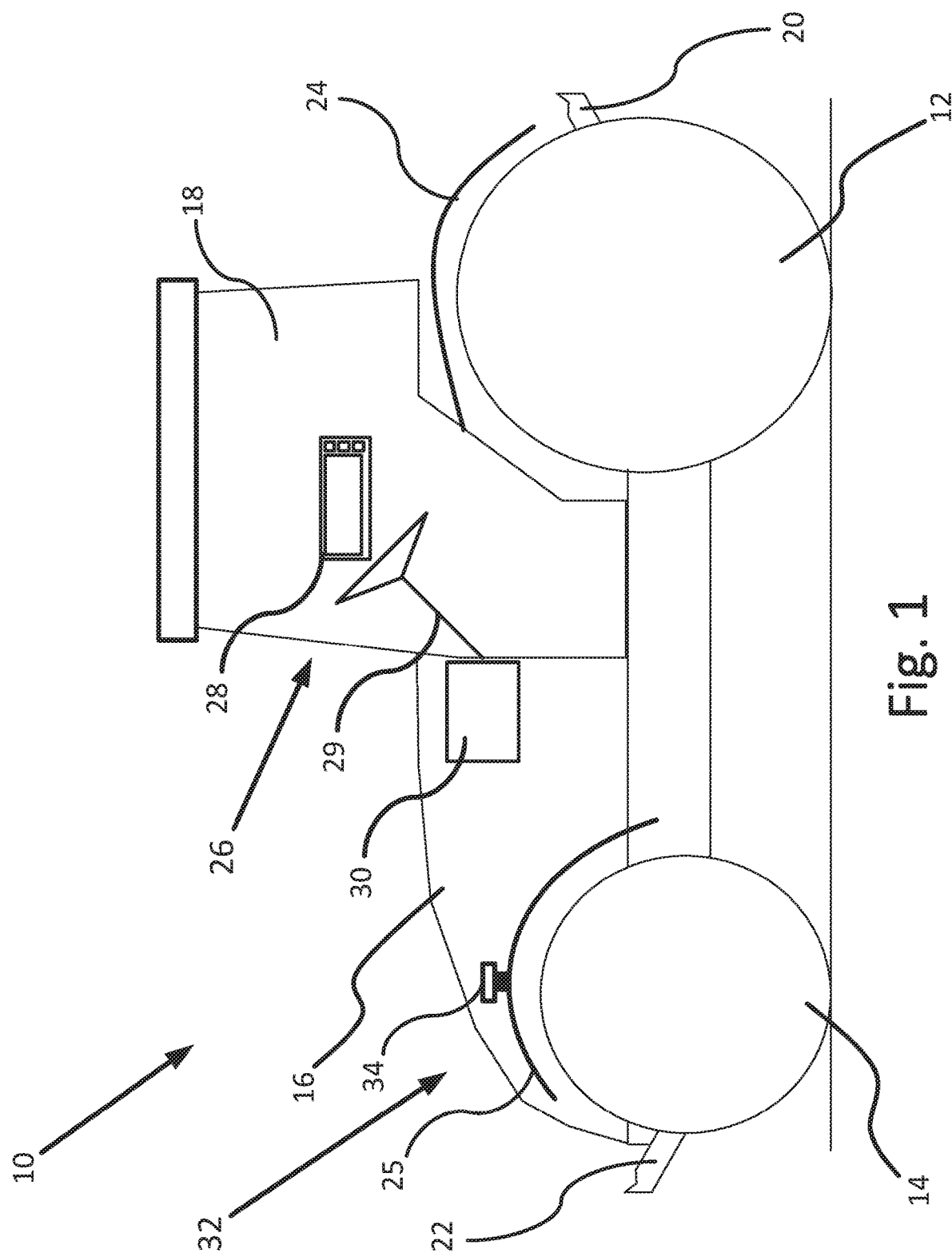
FIG. 1 is a side view of an agricultural tractor having a fender assembly according to an embodiment of the invention.

With reference to FIG. 1, a vehicle according to the invention in the form of an agricultural tractor is indicated at 10. The tractor 10 comprises rear wheels 12 and front wheels 14, a forward engine compartment 16 and a cab section 18. A rear linkage 20 is provided at the rear of the tractor 10, and a front linkage 22 is provided at the front of the tractor 10. Rear wheel fenders 24 are provided to cover a portion of the rear wheels 12, and front wheel fenders 25. The front wheel fender 25 is provided as part of a fender assembly indicated generally at 32, the front wheel fender 25 supported via a carrier bracket 34.

Within the cab 18, an operator station 26 is provided, where the operator can access a display terminal and associated operator controls 28, as well as a steering wheel or other associated steering controls 29. The tractor 10 is provided with at least one electronic control unit (ECU) 30. The ECU 30 is configured to interface with the operator controls 28, the steering controls 29 and with the various systems and sensors provided about the tractor 10, to provide for monitoring and control of tractor operation. The controls 28,29 and ECU 30 allow the operator to actuate different elements of the tractor 10, e.g. hydraulic circuits, lifting systems, HVAC operation, and/or to control the acceleration and steering of the tractor 10.

Embodiments of a fender assembly 32 according to the invention are illustrated in more detail in FIGS. 2-8. FIGS. 2-8 show an enlarged view of a single fender assembly 32 provided at the front of tractor 10, and it will be understood that the tractor 10 is preferably provided with complimentary fender assemblies for the left and right front wheels 14.

Figure 2:
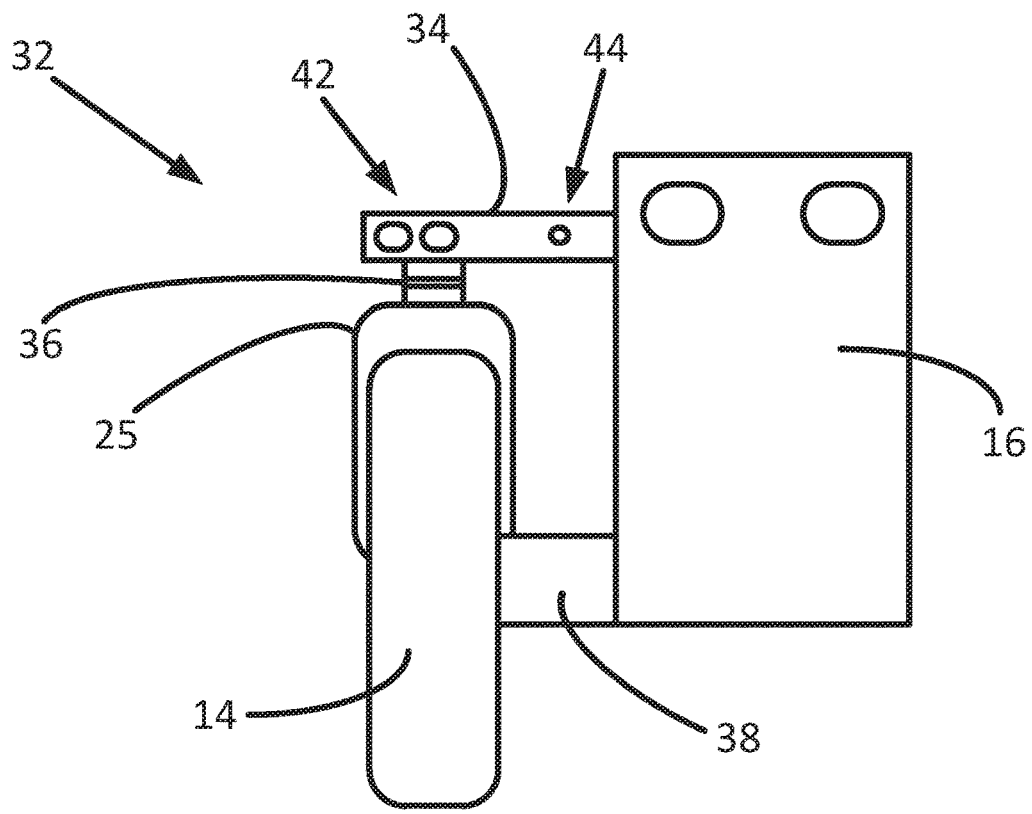
FIG. 2 is a front view of a portion of the tractor of FIG. 1.
Figure 3:
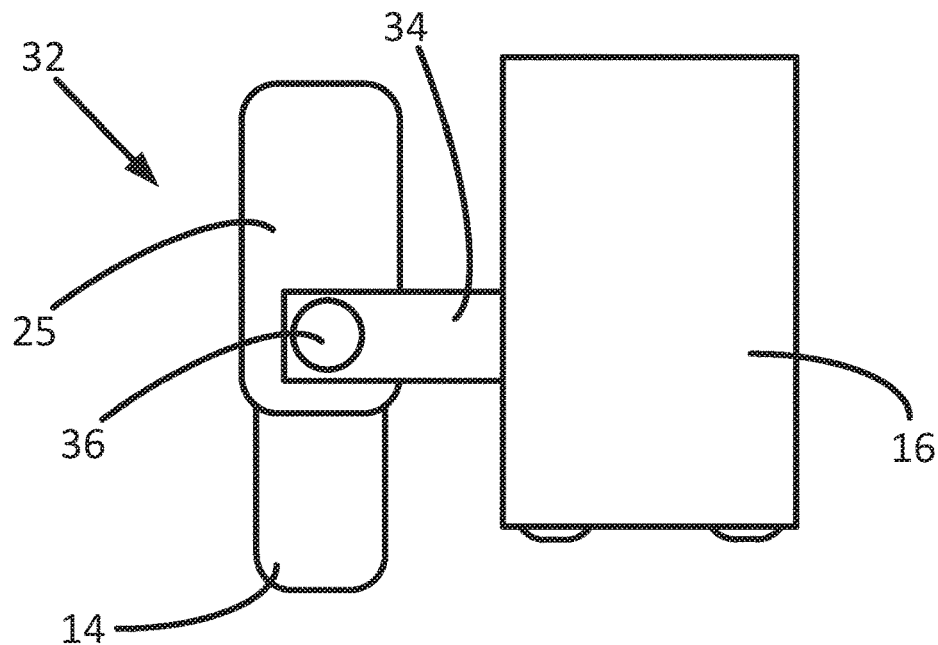
FIG. 3 is a top plan view of the portion shown in FIG. 2.

With reference to the enlarged front and top plan views of a portion of the tractor 10 shown in FIGS. 2 and 3, a front wheel 14 of the tractor 10 is provided on wheel carrier 38 which extends from the structural vehicle frame of the tractor 10. The fender assembly 32 comprises carrier bracket 34 which extends from the general frame of the tractor 10. The carrier bracket 34 is coupled to the vehicle frame at the forward engine compartment 16, the bracket 34 arranged to extend laterally outwards from the tractor 10, in a direction transverse to the longitudinal axis of the tractor 10. It will be understood that the carrier bracket 34 may be provided as an attachment which can be mounted to the frame of the tractor 10, or the carrier bracket 34 may be provided as an integrally-formed part of the structural frame of the tractor 10.

A steering mechanism 36 is provided on the carrier bracket 34 distal from the forward engine compartment 16. The wheel fender 25 is mounted to the steering mechanism 36, such that the wheel fender 25 is supported in position above the front wheel 14. The steering mechanism 36 comprises any suitable actuator device, e.g. an electric, hydraulic, pneumatic, or mechanically-controlled element, which is operable to rotate the supported wheel fender 25 above the front wheel 14 about a substantially vertical axis.

Figure 4:
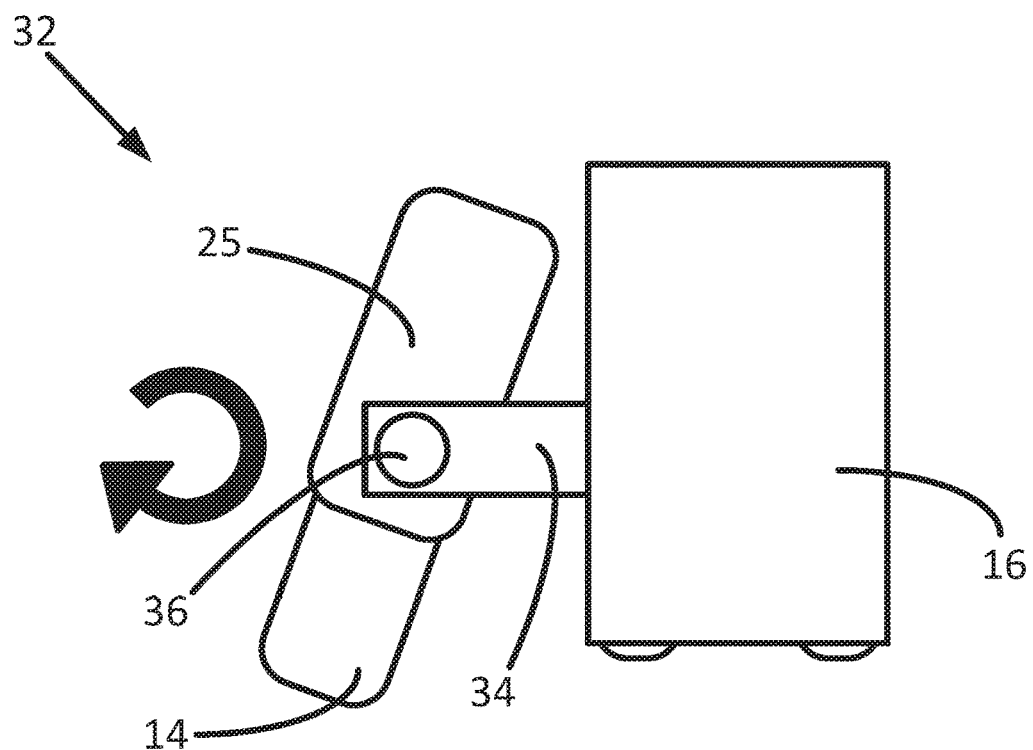
FIG. 4 is a top plan view as shown in FIG. 3, when the vehicle wheel and wheel fender are rotated to a first position.
Figure 5:
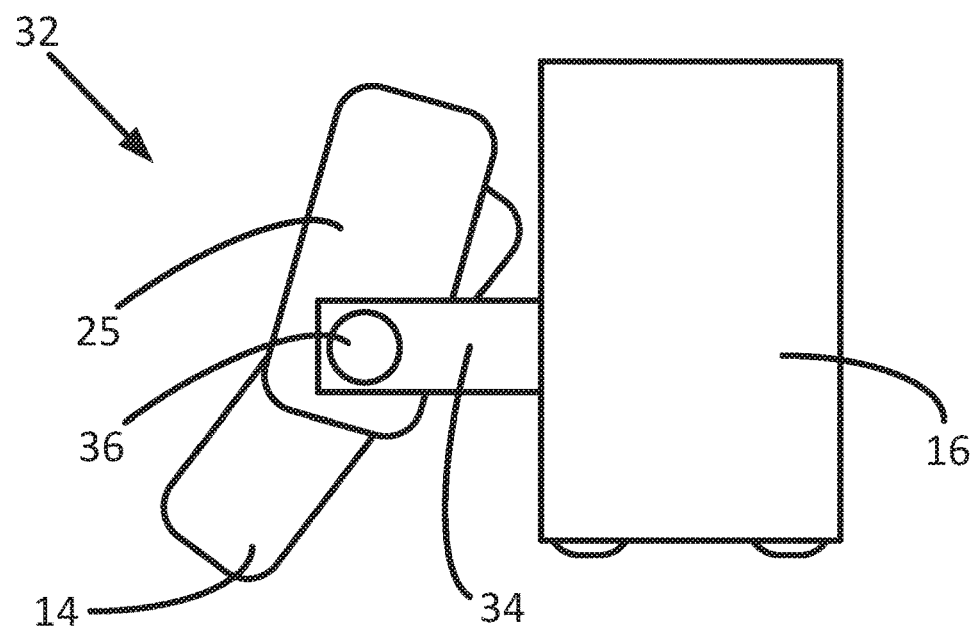
FIG. 5 is a top plan view as shown in FIG. 3, when the vehicle wheel and wheel fender are rotated to a second position.

The steering mechanism 36 is communicatively coupled with the steering controls 29 of the tractor 10, such that a steering command provided at the steering controls 29 to move the front wheels 14 of the tractor 10 also rotates the wheel fender 25. With reference to FIG. 4, as the front wheel 14 is rotated to face a rightwards direction, the steering mechanism 36 is controlled to rotate the wheel fender 25 in a clockwise direction about a vertical axis, such that the fender 25 follows the rotation of the adjacent wheel 14. The steering mechanism 36 ensures that the wheel fender 25 is in an appropriate position to cover and shield the adjacent wheel 14, when the wheel is rotated.

It will be understood that the link between the steering controls 29 of the tractor 10 and the steering mechanism 36 of the fender assembly 32 may be provided in any suitable manner. For example, the link may comprise a purely mechanical connection, e.g. using a suitable control cable. Alternatively, the steering mechanism 36 may be connected to a pneumatic or hydraulic steering circuit actuated by the steering controls 29. Further alternatively, in the case of an electronically-controlled steering system, the steering mechanism 36 may be coupled with an ECU 30 of the tractor 10, wherein the ECU 30 outputs steering signals to different steerable components of the tractor 10.

In a further aspect of the invention, the steering mechanism may be configured to prevent over-rotation of the wheel fender 25, in the event that continued rotation of the fender 25 may result in the fender 25 striking a portion of the general structure of the tractor 10. In the top plan view of FIG. 5, the wheel 14 shown in FIG. 4 is further rotated to the right, at which point the steering mechanism 36 is configured to limit rotation of the adjacent wheel fender 25 to prevent the fender 25 from impacting against the forward engine compartment 16. This preventative action may be provided through the steering mechanism 36 itself, for example mechanical stops may be placed in the steering mechanism 36 to prevent over-rotation of the wheel fender 25. Alternatively, the ECU 30 may process a steering signal received from the steering controls 29 such that the signal provided to the fender assembly 32 ensures that the wheel fender 25 does not over-rotate.

Figure 6:
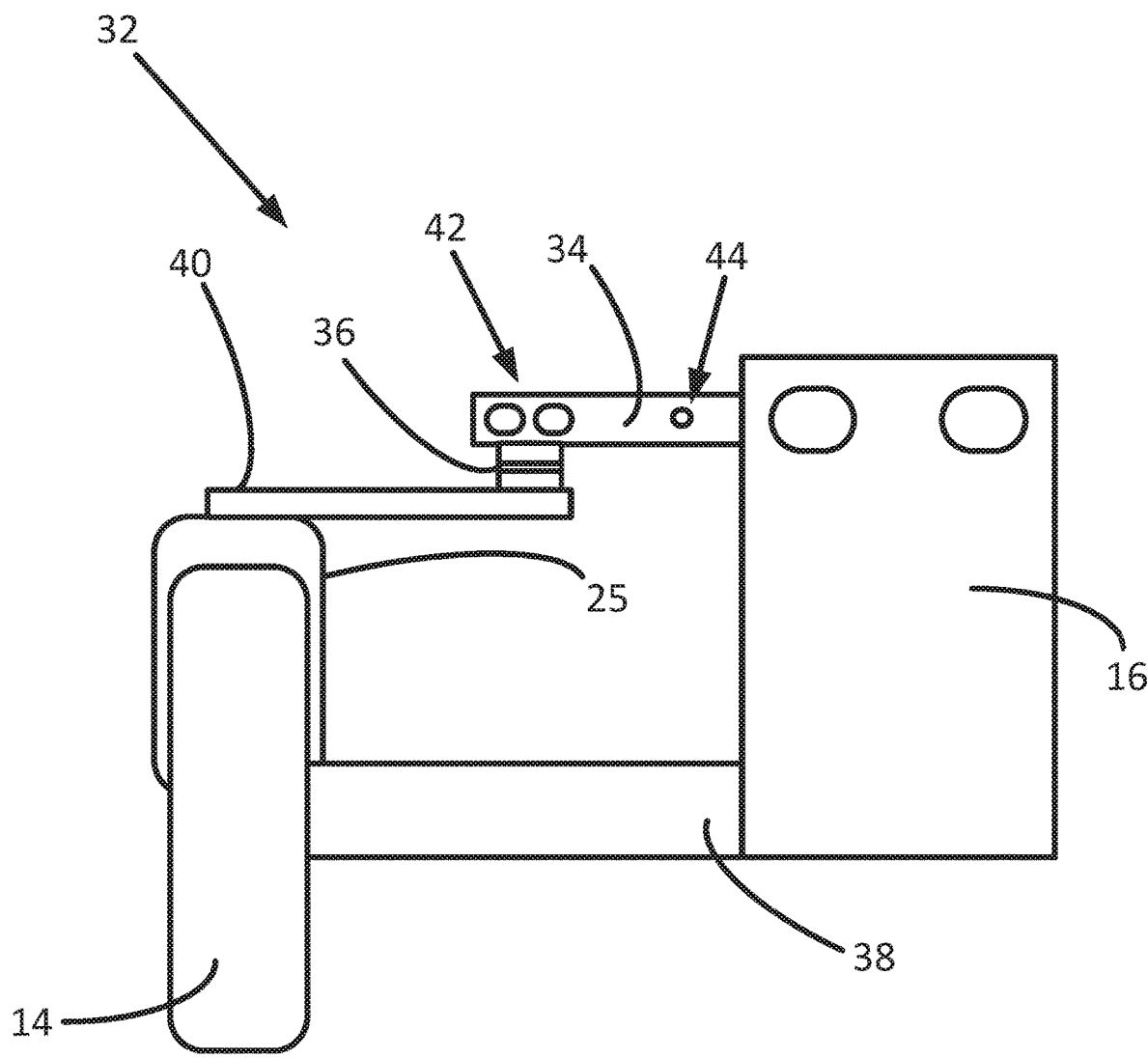
FIG. 6 is a front view of a portion of the tractor of FIG. 1, according to a further embodiment of the invention.

A further aspect of the invention is illustrated in FIG. 6, wherein the fender assembly 32 can accommodate a vehicle having adjustable track widths. Some vehicles, and in particular many agricultural tractors 10, are provided with adjustable track widths. This provides several advantages, for example it allows tractors to be used with different types of trailed machinery having varied track widths, such that the tractor and trailed machinery can follow a single set of track lines, thereby minimising soil compaction effects for the field being worked. In the system of FIG. 6, the fender assembly 32 comprises an extendable element 40 provided on the steering mechanism 36. The extendable element 40 allows the wheel fender 25 to be moved along a lateral or transverse direction relative to the longitudinal centreline of the tractor 10. The extendable element 40 can be extended or retracted, such that the wheel fender 25 can be moved from a retracted position wherein the wheel fender 25 is located adjacent the carrier bracket 34 (for example, as shown in FIGS. 2-5), to an extended position wherein the wheel fender 25 is located distal from the carrier bracket 34 (as shown in FIG. 6). Such extension or retraction of the extendible element 40 can be controlled such that the wheel fender 25 is positioned adjacent the front wheel 14 for any selected track width of the tractor 10. The extendible element 40 can also be used to move the wheel fender 25 away from the main body of the tractor 10, to provide for easier access to areas of the forward engine compartment 16, e.g. for a service or repair operation. In such an embodiment, the pivot point for the assembly and the wheel 14 is preferably arranged to be concentric with the pivoting axis of the steering mechanism 36.

In the embodiment of FIG. 6, the extendible element 40 is carried by the steering mechanism 36, such that the steering mechanism 36 is operable to rotate the wheel fender 25 and the extendible element 40 when the wheel fender 25 is in the extended position. The extendible element 40 may be provided using any suitable construction, e.g. as a telescopic element or a rail element.

Figure 7:
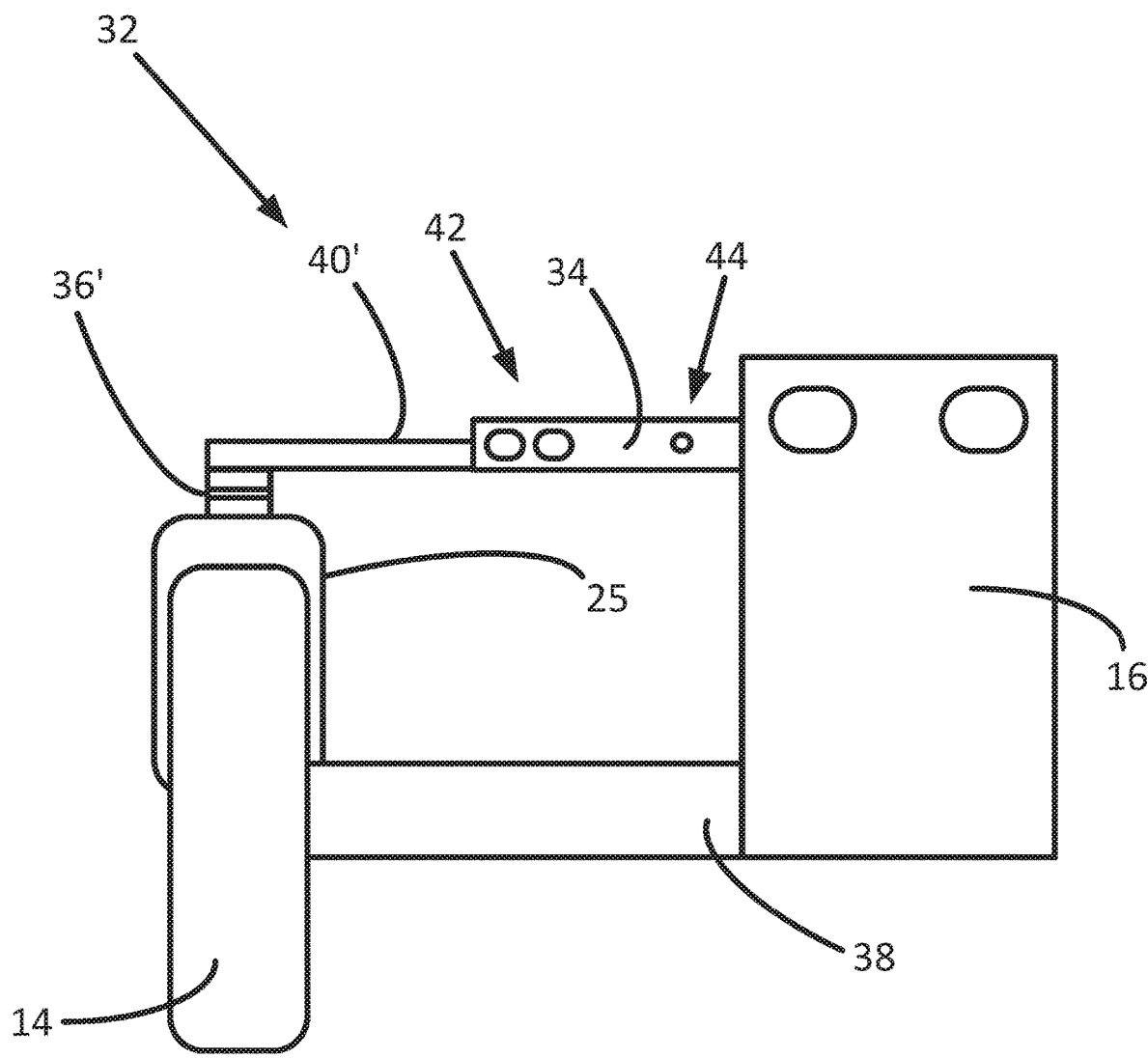
FIG. 7 is a front view of a portion of the tractor of FIG. 1, according to a further embodiment of the invention.
Figure 8:
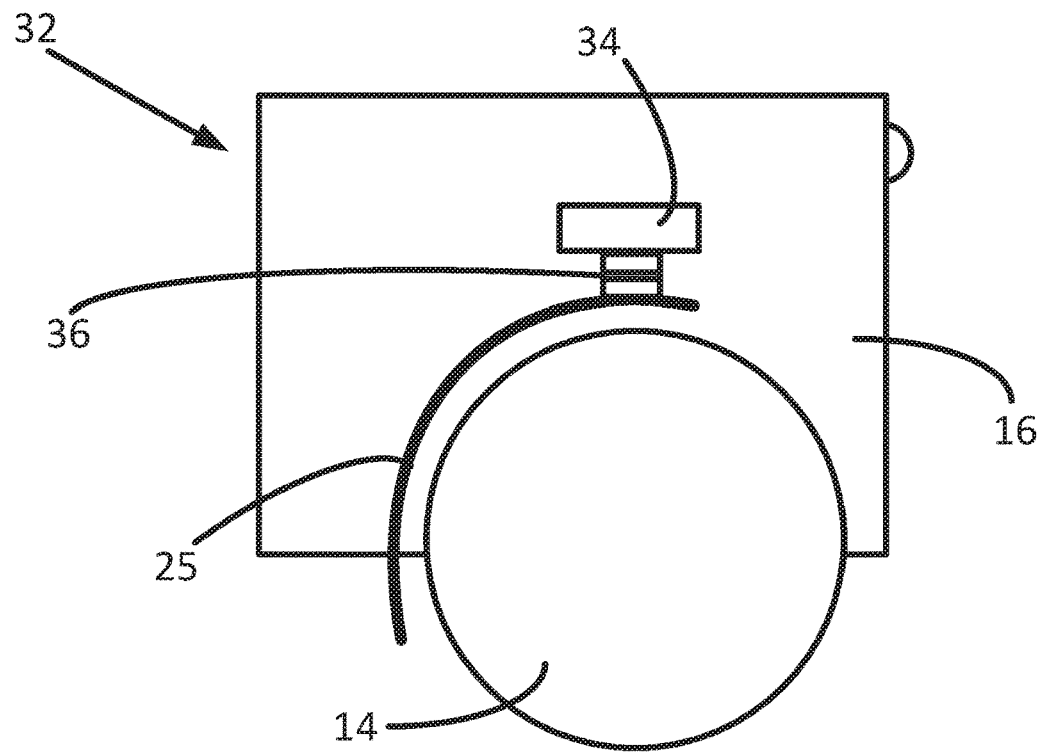
FIG. 8 is a side plan view of a portion of a tractor having a fender assembly according to a further embodiment of the invention.
Figure 9:
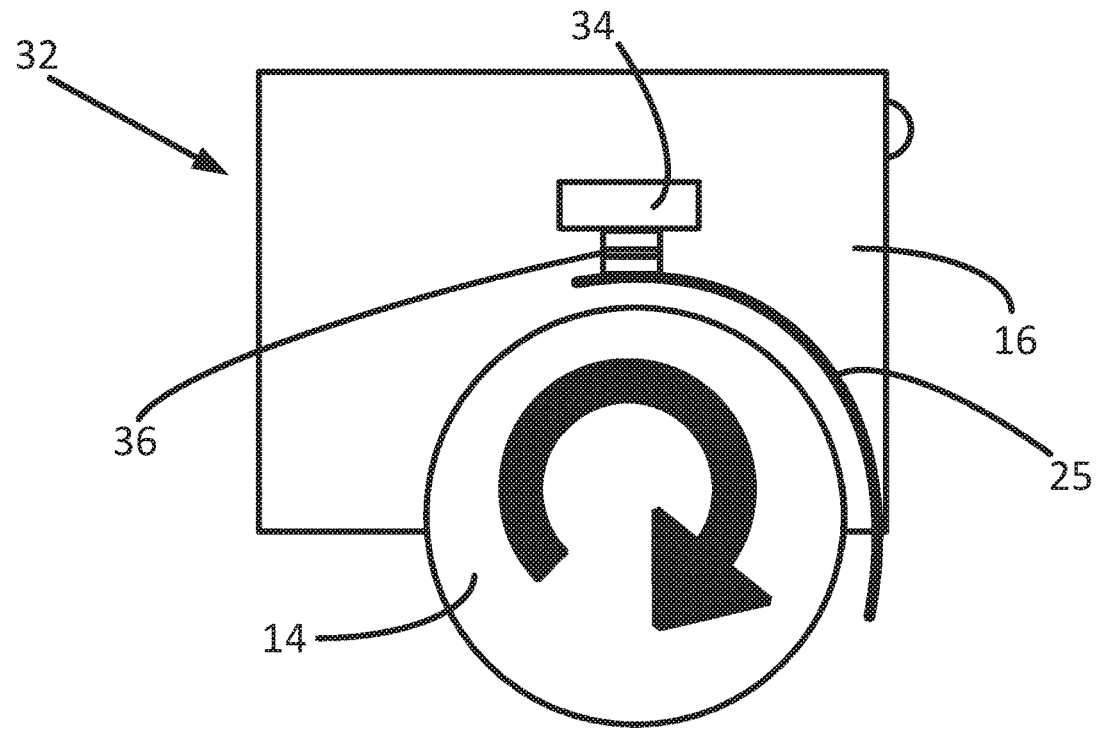
FIG. 9 is a further side plan view as shown in FIG. 8, when the wheel fender is rotated to a service position.

In a further aspect, the fender assembly 32 may be configured to allow for the rotation of the wheel fender 25 about a portion of the circumference of the adjacent wheel 14. With reference to the enlarged side views provided in FIGS. 7 and 8, the wheel fender 25 is generally retained in position above the front wheel 14 to guard against any dirt or other debris raised by the wheel 14 during rotation (FIG. 7). For a service or repair operation requiring access to the forward engine compartment 16 of the tractor 10, the wheel fender 25 may be rotatable along a path parallel to the circumference of the front wheel 14, such that the fender 25 can be moved away from preventing easy access to the forward engine compartment 16. Such a movement may be facilitated be a rail connection defined on the wheel fender 25 between the fender 25 and the steering mechanism 36, allowing rotation of the wheel fender 25 in the direction as indicated by the arrow of FIG. 8.

A further aspect of the invention is illustrated in FIG. 7, wherein the fender assembly 32 can accommodate a vehicle having broader front axles. In the system of FIG. 7, the fender assembly 32 comprises an extendable element 40' provided on the carrier bracket 34. The extendable element 40' supports the steering mechanism 36', and allows the wheel fender 25 to be moved along a lateral or transverse direction relative to the longitudinal centreline of the tractor 10. The extendable element 40' can be extended or retracted, such that the wheel fender 25 can be moved from a retracted position wherein the wheel fender 25 is located adjacent the carrier bracket 34 (for example, as shown in FIGS. 2-5), to an extended position wherein the wheel fender 25 is located distal from the carrier bracket 34 (as shown in FIG. 6). Such extension or retraction of the extendible element 40' can be controlled such that the wheel fender 25 is positioned adjacent the front wheel 14 for any selected track width of the tractor 10. The extendible element 40' can also be used to move the wheel fender 25 away from the main body of the tractor 10, to provide for easier access to areas of the forward engine compartment 16, e.g. for a service or repair operation. Such a system may be advantageously used on a relatively small or low horsepower tractor.

With reference to FIGS. 2, 6 and 7, the carrier bracket 34 may be provided with light fixtures 42 mounted on the bracket 34. Such light fixtures 42 may comprise any suitable light fitting for use with the tractor 10, e.g. an indicator light, a headlight, a spotlight. The ability to provide additional light fixtures 42 on the laterally-extending carrier bracket 34 allows for an increased area of illumination for the tractor 10, aiding the vehicle operator's view of the surroundings.

Additionally or alternatively, the carrier bracket 34 may be provided with at least one camera 44. Such additional camera devices 44 can be used to provide a visual feed of the area around the adjacent vehicle wheel 14. In the case of vehicles of relatively large dimensions, this can allow the vehicle operator to more easily and reliably see the exact driving path of the vehicle wheels 14.

Moreover or alternatively, the carrier bracket 34 may be provided with at least one sensor (not shown). Such a sensor (e. g. an ultrasonic sensor or a radar sensor) can be used in various control systems of the vehicle, e.g. steering control or autonomous drive of the vehicle.

By providing a fender assembly which is not mounted to a wheel carrier, and which allows for rotation of a wheel fender with an adjacent wheel, accordingly adjustable wheel fender position can be effectively provided for any dimension of vehicle. Such a system provides an improvement over the prior art, particularly in the area of agricultural tractors, where increased wheel and vehicle dimensions prevent effective use of existing wheel fender supports.

The invention is not limited to the embodiments described herein, and may be modified or adapted without departing from the scope of the present invention.

The invention claimed is:

1. An agricultural tractor, comprising:
   a tractor frame;
   a tractor wheel provided on a wheel carrier, the wheel carrier mounted to the tractor frame; and
   a steering system arranged to steer the tractor wheel;
   wherein the tractor further comprises at least one fender assembly, the fender assembly comprising:
   a carrier bracket attached to the tractor frame, the carrier bracket separate from the wheel carrier wherein the fender assembly comprises at least one camera provided on the carrier bracket;
   a wheel fender supported by the carrier bracket to be located above the tractor wheel; and
   a steering mechanism provided on the carrier bracket, the wheel fender mounted to the steering mechanism, wherein the steering mechanism arranged to receive a steering signal from the steering system of the tractor, and wherein the steering mechanism rotates the wheel fender relative to the carrier bracket based on the received steering signal.

2. The agricultural tractor of claim 1, wherein the steering mechanism is arranged to rotate the wheel fender to substantially follow rotation of the tractor wheel.

3. The agricultural tractor of claim 1, wherein the steering mechanism comprises an actuator operable to rotate the wheel fender.

4. The agricultural tractor of claim 1, wherein the steering mechanism rotates the wheel fender about a vertical axis.

5. The agricultural tractor of claim 1, wherein the fender assembly further comprises an extendable element coupled to the wheel fender, the extendable element operable to move the wheel fender between a retracted position wherein the wheel fender is located adjacent the carrier bracket, to an extended position wherein the wheel fender is located distal from the carrier bracket.

6. The agricultural tractor of claim 5, wherein the extendable element comprises a telescopic element.

7. The agricultural tractor of claim 5, wherein the extendable element is provided as a rail element, the wheel fender moveable in a lateral direction along the rail relative to the carrier bracket.

\* \* \* \* \*